US010048107B2

(12) United States Patent
Reuter (10) Patent No.: US 10,048,107 B2
(45) Date of Patent: Aug. 14, 2018

(54) METERING UNIT (71) Applicant: Marco Systemanalyse und Entwicklung GmbH, Dachau (DE)

(72) Inventor: Martin Reuter, Dachau (DE)

(73) Assignee: MARCO SYSTEMANANALYSE UND ENTWICKLUNG GMBH, Dachau (DE)

( * ) Notice: Subject to any disclaimer, the term of this patent is extended or adjusted under 35 U.S.C. 154(b) by 234 days.

(21) Appl. No.: 15/078,454

(22) Filed: Mar. 23, 2016

(65) Prior Publication Data
US 2016/0279662 A1 Sep. 29, 2016

(30) Foreign Application Priority Data

Mar. 27, 2015 (DE) .................. 10 2015 104 791

(51) Int. Cl.
*G01F 15/00* (2006.01)
*G01F 11/02* (2006.01)

(52) U.S. Cl.
CPC .......... *G01F 15/005* (2013.01); *G01F 11/021* (2013.01)

(58) Field of Classification Search
CPC ........ G01F 1/00; G01F 11/021; G01F 15/005; G01F 23/00; B05C 11/1026
See application file for complete search history.

(56) References Cited

U.S. PATENT DOCUMENTS

| 5,499,745 | A |   | 3/1996  | Derian et al. |
| 5,747,102 | A | * | 5/1998  | Smith ............. B05C 5/001 222/1 |
| 6,079,596 | A | * | 6/2000  | Dedoes ............. F04B 13/00 222/309 |
| 2004/0256501 | A1 |   | 12/2004 | Mellentine et al. |
| 2006/0065671 | A1 |   | 3/2006  | Varga et al. |
| 2006/0157517 | A1 | * | 7/2006  | Fiske ............... B05C 5/001 222/504 |
| 2008/0105701 | A1 | * | 5/2008  | Niss ............... B05C 17/0103 222/1 |
| 2012/0323502 | A1 | * | 12/2012 | Tanoura ............ G01F 1/00 702/47 |
| 2013/0119083 | A1 | * | 5/2013  | Ophardt ........... A47K 5/1204 222/64 |
| 2013/0313289 | A1 | * | 11/2013 | Doerr ............. G05D 7/0635 222/394 |
| 2014/0116535 | A1 | * | 5/2014  | Tix ............... G01F 23/2962 137/334 |

(Continued)

FOREIGN PATENT DOCUMENTS

| CN | 1849486 A     | 10/2006 |
| DE | 102004021223 A1 | 12/2004 |
| DE | 102009037105 A1 | 8/2010  |

(Continued)

OTHER PUBLICATIONS

Japanese Office Action dated Oct. 31, 2016 for Japanese Patent Application No. 2016-047797, 3 pages.

(Continued)

*Primary Examiner* — David Bolduc
(74) *Attorney, Agent, or Firm* — Cantor Colburn LLP (57) ABSTRACT

A metering unit has a module carrier having a fastening element, a valve module and a media store which is replaceably fastened to the module carrier.

20 Claims, 13 Drawing Sheets (56) References Cited

U.S. PATENT DOCUMENTS

2014/0217123 A1* 8/2014 Ophardt ............... A47K 5/1207
                                                                                            222/190

FOREIGN PATENT DOCUMENTS

| JP | S5339768 A | 4/1978 |
|----|------------|--------|
| JP | 2008036619 A | 2/2008 |
| WO | 2012104076 A1 | 8/2013 |

OTHER PUBLICATIONS

German Search Report for related German Application No. 102015104791.8, dated Sep. 28, 2015, pp. 7.
Chinese Office Action from the Chinese Patent Office for related CN Application No. 20160169024.9 dated Dec. 6, 2017; including English translation; 10 pages.

* cited by examiner

METERING UNIT

The present invention relates to a metering unit for the automated metering of liquid media.

The metering of liquid media, for example of adhesives, coatings or the like, typically takes place by the interaction of different elements. A liquid, which can have differing viscosity, is typically pressurized in a storage tank and is mostly metered in drop form with the aid of a valve.

It is the object of the present invention to provide a metering unit of the initially named kind which can be used flexibly in an automated application.

This object is satisfied by the features of claim 1 and in particular by a metering unit comprising a module carrier having a fastening element, in particular a replaceable fastening element, for fastening to a robot, to a valve module which is fastened, in particular replaceably, to the module carrier, and to a media store which is replaceably fastened to the module carrier.

A continuously modular design results with the metering unit in accordance with the invention such that individual modules of the system can be replaced in a simple manner, for example when they are defective, have to be serviced or if a modification of the metering unit is required for another application purpose. The metering unit can be fastened to a robot in a simple manner by the fastening element provided at the module carrier. Further modifications of the metering unit can be achieved in a simple manner by the design of the valve as a valve module and by providing a replaceable media store. For example, a media store configured as a tank can be replaced with a media store which acts as a cartridge holder. The metering unit can hereby be operated both with a tank which can be filled from a reservoir and with replaceable cartridges.

Advantageous embodiments of the invention are described in the description, in the drawing and in the dependent claims.

In accordance with a first advantageous embodiment, a single plug-in connection can be provided for the electrical supply via which plug-in connection both a supply voltage and a data bus can be coupled to the metering unit. The number of required connections between the robot arm and the metering unit is minimized in this manner. At the same time, an intelligent control of the metering unit or of the modules and sensors located on the metering unit can take place.

In accordance with a further advantageous embodiment, a replaceable expansion module which forms a distributor for electrical supply lines and data lines can be connected to the module carrier. The metering unit can be converted by such an expansion module from simple applications with, for example, only one electrical component, to more demanding applications in which a plurality of electrically controllable components and/or sensors are provided at the module carrier.

It can be advantageous if the media store is configured as a heatable cartridge holder since in this case the viscosity of the medium can be influenced by the heating provided at the media store despite the use of cartridges.

In accordance with a further advantageous embodiment, a reception for a replaceable filling level sensor can be provided at the media store. The metering unit can hereby be equipped or retrofitted with a filling level sensor if this is desired. The filling level sensor hereby in turn represents a replaceable module of the metering unit which can be provided as required without further measures being required—with the exception of the assembly.

In accordance with a further advantageous embodiment, a control valve for the compressed air supply can be provided on the module carrier. The liquid to be metered can hereby be pressurized to increase the metering precision.

In accordance with a further advantageous embodiment, a closure can be provided at the media store through which a compressed air supply is conducted. In this manner, compressed air within the metering unit can be conducted into the interior of the media store or into the interior of a cartridge arranged in the media store so that an application of compressed air to the liquid is also possible on a replacement of the cartridge or after a refilling of the media store.

It can be advantageous in this respect if a dry pack is integrated into the closure since compressed air is frequently moist and some media react with moisture. In accordance with a further advantageous embodiment, the compressed air can be conducted from the compressed air guide within the closure through the dry pack so that the air is dehumidified before application to the liquid.

In accordance with a further embodiment, a closure can be provided at the closure with which a cartridge inserted into the media store can only be locked in a defined orientation—with respect to the peripheral direction. This is advantageous on the use of cartridges which are provided with two wings for a bayonet fastening at the upper side. It can namely be ensured in this case that the two wings of the cartridge always have a defined orientation in which the wings allow a compressed air supply.

It can be advantageous in the same way if a connector piece provided with a thread for a cartridge outlet is mounted at the media store such that it can be fixed in different positions with respect to its orientation in the peripheral direction. Commercial cartridges are namely frequently provided with a standardized thread at their cartridge outlet into which thread a connector piece can be screwed. If such a connector piece were, however, mounted rigidly in any desired position at the metering unit, it could not be ensured after the screwing of the cartridge into the connector piece that the above-described desired orientation of the cartridge in the peripheral direction is present. It is, however, possible in the described embodiment first to screw the cartridge to the connector piece, subsequently to align the cartridge such that the desired orientation in the peripheral direction is reached and only then to fix the connector piece in the now achieved orientation (with respect to the peripheral direction). It is hereby achieved that, with a subsequent replacement of the cartridge, no further adjustments are necessary since the thread of the subsequent cartridge has the same geometry (at least within one and the same lot) as the thread of the replaced cartridge.

In accordance with a further advantageous embodiment, a pressure multiplier operable with compressed air can be attached to the media store and has a piston which can be traveled into the media store. The pressure of the supplied air can be increased by a factor of 3 or more, for example, using such a pressure multiplier, which can be advantageous for specific applications. It is at the same time not necessary in this embodiment that additional pressure units have to be provided or that a modified module carrier has to be used.

It can be advantageous if a media supply is arranged replaceably between the media store and the valve module. A heating, or a mixing element can, for example, be installed in such a media supply so that the flexibility of the metering unit is further increased. The metering unit can be simply adapted to the requirements for different liquids by replacing or using a different media supply.

In accordance with a further advantageous embodiment, the fastening element can be a replaceable adapter plate with whose aid the metering element can be fastened to different robot arms without a variation of the module carrier being required.

An advantageous embodiment is provided by a metering unit in which the valve module has a data bus connector and a data bus processor. The valve module can hereby serve as an intelligent control element for the metering unit to control possible further components via the data bus and with the aid of the data bus processor.

In accordance with a further advantageous embodiment, a float body can be arranged in the media store which cooperates with a filling level sensor, with the media store being fillable through the float body. The media store can in this manner be filled or refilled with medium or liquid from its upper side at any time without operation having to be interrupted. If, for example, the media store has been largely emptied and if the float body has reached a lower end point, it can be signaled via the filling level sensor with the aid of the data bus that medium has to be refilled so that medium can subsequently be filled into the media store through the float body, whereupon the float body is moved upward again by buoyancy until it has reached an upper end position in which the media supply is switched off.

In accordance with a further advantageous embodiment, a pressure store and in particular also a heating device can be integrated in the media store. In this embodiment, pressure fluctuations can be eliminated which arise from a compressed air source.

In accordance with a further embodiment, the valve module can be integrated in the module carrier so that a particularly compact embodiment results.

In accordance with a further embodiment, the media store can be arranged in a horizontal position, with a rotation device being able to be provided to rotate the media store about its horizontal axis. This embodiment has the advantage, on the one hand, that a sedimentation of the filling material cannot occur during longer metering periods, which would influence the homogeneity of the medium in a time-dependent manner and which would impair the metering result. On the other hand, a continuous blending of the medium can take place by the rotation of the media store, which increases its homogeneity.

It can furthermore be advantageous if the compressed sir in the above-mentioned closure is conducted from the compressed air guide through the dry pack since a dehumidifying of the supplied compressed air hereby takes place.

The present invention will be described in the following purely by way of example with reference to different embodiments and to the enclosed drawings. There are shown.

Figure 1:
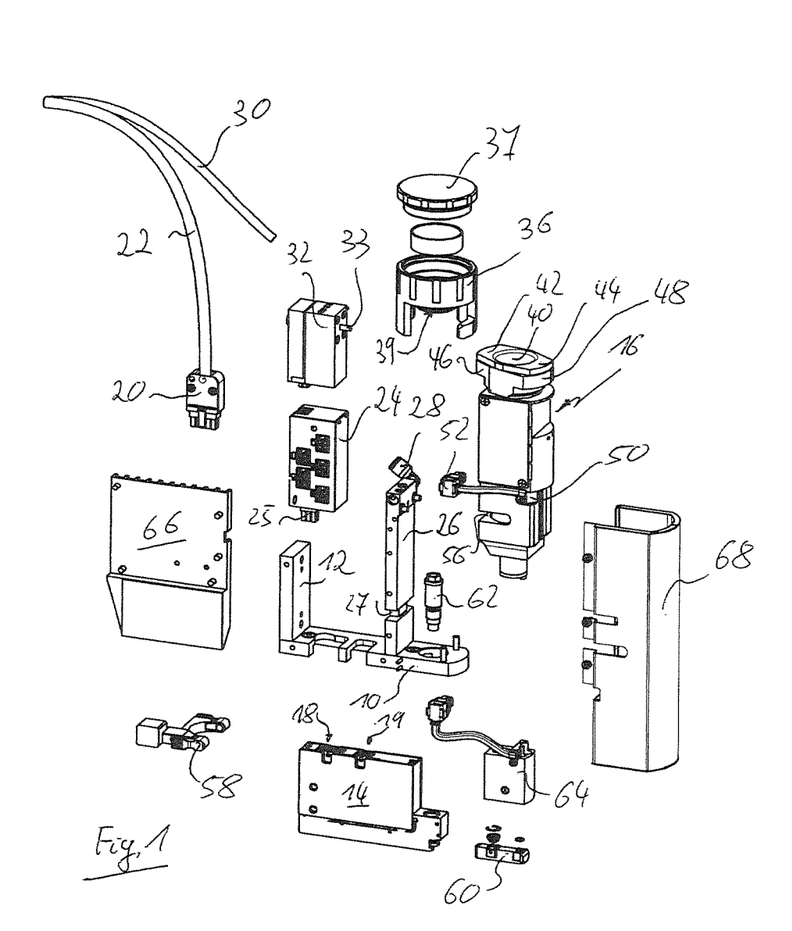
FIG. 1 an exploded representation of a first embodiment of a metering unit.
Figure 2:
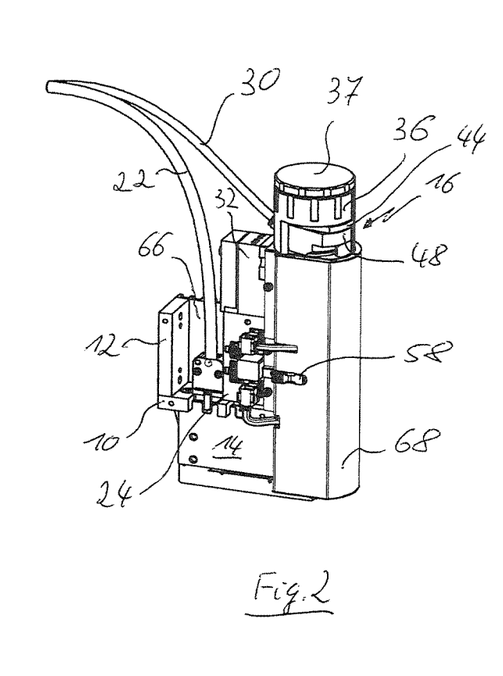
FIG. 2 the metering unit of FIG. 1 in the assembled state.

The metering unit shown in FIGS. 1 and 2 for the automated metering of liquid media is of a completely modular structure and comprises a module carrier 10 which, in the embodiment shown, is provided with a replaceable fastening element for fastening to a robot, wherein the fastening element in the embodiment shown is a changeable adapter plate 12 which is provided with assembly bores for fastening to the robot arm.

The metering unit furthermore comprises a valve module 14 as well as a media store 16 which are replaceably fastened to the module carrier 10.

For the electrical supply of the metering unit, a single plug-in connector 18 is provided at the valve module 14 into which a plug 20 can be plugged to couple in both a supply voltage and a data bus via a single cable 22.

To electrically couple further modules and/or sensors or components to the metering unit, in the embodiment shown, a replaceable expansion module is connected to the module carrier 10 and forms a distributor for electrical supply and data lines. The expansion module 24 is formed in parallelepiped shape and is provided at its lower side with a plug 25 which can be plugged into a second plug-in connector 19 of the valve module 14 so that the valve module 14 is arranged at the lower side of the module carrier 10 and the expansion module 24 is arranged at the upper side of the valve module.

An intermediate carrier 26 is furthermore provided at the upper side of the module carrier 10; it extends in parallel with the adapter plate 12, is of substantially parallelepiped shape and serves for fastening further components and for the air distribution. For this purpose, the intermediate carrier 26 is provided at its upper outer side with a compressed air connector 28 via which the metering unit can be supplied with compressed air with the aid of a compressed air line 30. The supplied compressed air is conducted from the compressed air connector 28 through the intermediate carrier 26 into a compressed air valve 32 which is likewise of parallelepiped shape and which is plugged by an electrical plug-in connector to the upper side of the expansion module 24. The compressed air valve 23 can be screwed tight to the intermediate carrier 26 with the aid of a screw 33 so that the expansion module 24 is hereby simultaneously fastened to the module carrier 10. The compressed air valve 32 can hereby simultaneously be electrically actuated, with the control taking place via data lines which are connected to the data bus which is guided from the plug 20, via the valve module 14 and via the expansion module 24.

To supply the compressed air supplied through the compressed air line 30 into the media store 16 in a metered manner, said compressed air is conducted from an outlet of the valve 32 back into an air passage of the intermediate carrier 26 which ends at the upper end side of the intermediate carrier 26. In the fully assembled state (FIG. 2), this air outlet is covered by a closure 36 such that an air guide passage provided in the closure is aligned with the air outlet at the upper end side of the intermediate carrier 26 so that air can be conducted through the closure 36 into the interior of the media store 16.

In the embodiment shown, the media store 16 is configured as a cartridge holder, i.e. a cartridge 40 provided with two wings 42 and 44 at its upper side is inserted in the media store 16 (cf. also FIG. 3) and is coupled to the media store 16 with the aid of the closure 36 which is configured as a bayonet fastening. To ensure an always unchanging orientation of the cartridge 40 in the peripheral direction, two flanges 46 and 48 are provided at the upper side of the media store 16 which correspond to the wings 42 and 44 of the cartridge 40 and with which the wings 42 and 44 can come into alignment with a suitable alignment of the cartridge 40. In the latched state of the closure 36, the wings 42 and 44 are automatically pressed into this aligned orientation so that a defined position of the cartridge is fixed with respect to its peripheral direction.

As FIG. 1 illustrates, in the embodiment shown, the media store 16 is provided with a heating device 50 which is connected to the expansion module 24 via a cable and a plug-in connector 52.

To achieve a particularly compact design, the media store 16 is provided in its lower third with a receiver 56 for a replaceable filling level sensor 58 which works with ultrasound and which is in turn connected to the expansion module 24 via a cable and a plug-in connector. The filling level sensor 58 is substantially formed in C-shape in a plan view and can be pushed into a corresponding receiver of the module carrier 16 so that the ultrasound can be applied directly from the outside to the wall of the cartridge 40. The intermediate carrier 26 is provided with two recesses 27 for a particularly space-saving arrangement so that the filling level sensor 58 is completely integrated into the metering unit and is simultaneously held in it.

The valve module 14 is provided at its front lower side with a vale insert 60 which is selected in dependence on the specification of the metering process and through which the medium to be metered is output. A media supply 62 serves for the supply of the medium from the media store 26; it is plugged into a heating device 64 which is in turn connected to the expansion module 24 via a cable and via a plug.

A cover 66, which can be provided with cooling bodies as a heating protection cover, is provided at the rear side of the metering unit shown in FIG. 2. Finally, reference numeral 68 designates an outer housing which is provided with an inwardly disposed insulation, which is U-shaped-in cross-section, which is plugged via the media store 16 and which is connected to the intermediate carrier 26.

Figure 3:
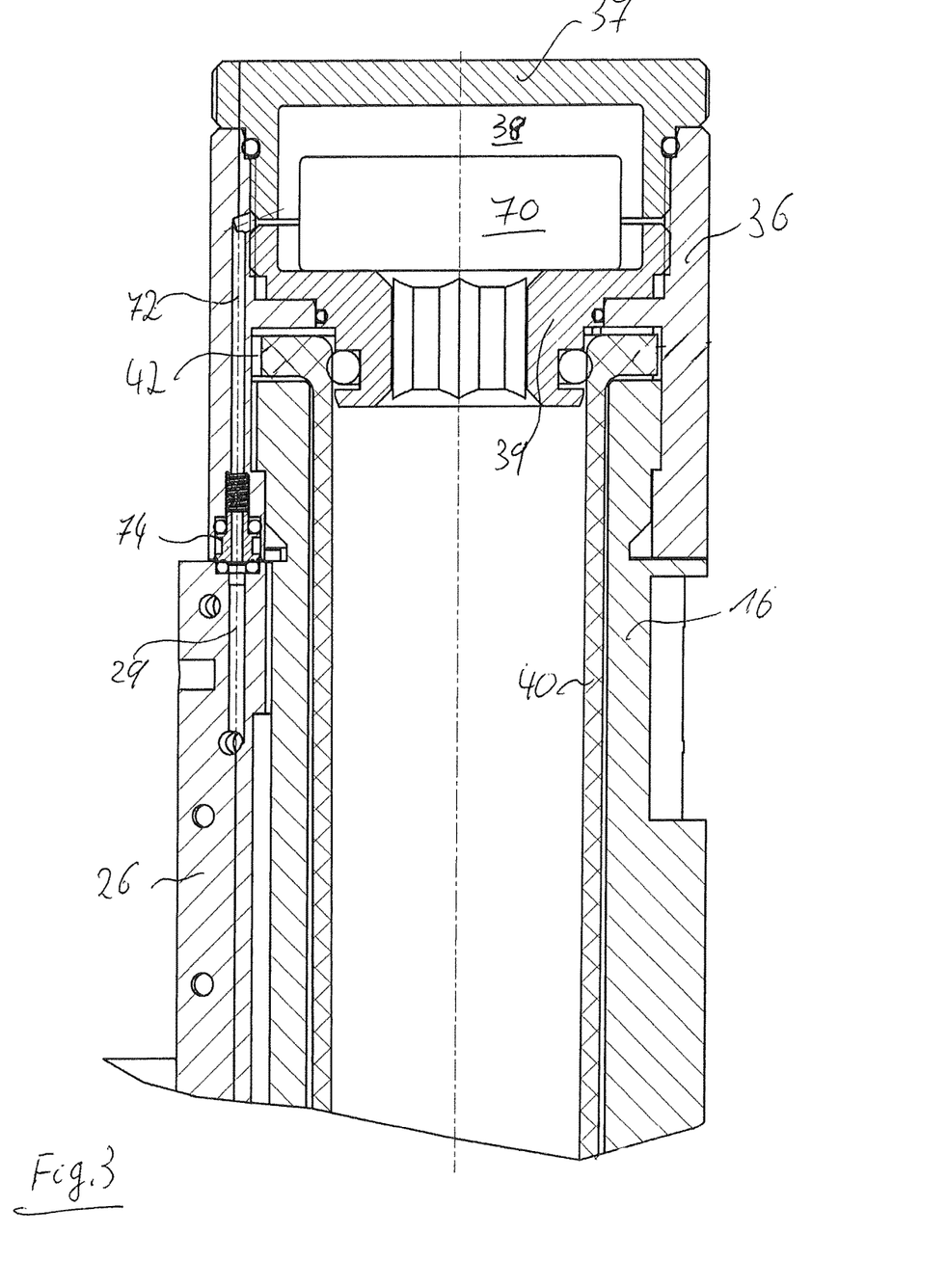
FIG. 3 a longitudinal section through a closure of the metering unit of FIG. 1 and FIG. 2.

FIG. 3 shows an enlarged longitudinal section through the cartridge holder 16 with an inserted cartridge 40, with it being recognizable that the closure 36 is provided with a cover 37 sealed via an O ring and screwed into the closure 36. An insert 39 is screwed into the closure 36 beneath the cover 37, with an intermediate space 38 in which a dry pack 70 is arranged being formed between the cover 37 and the insert 39.

Figure 4:
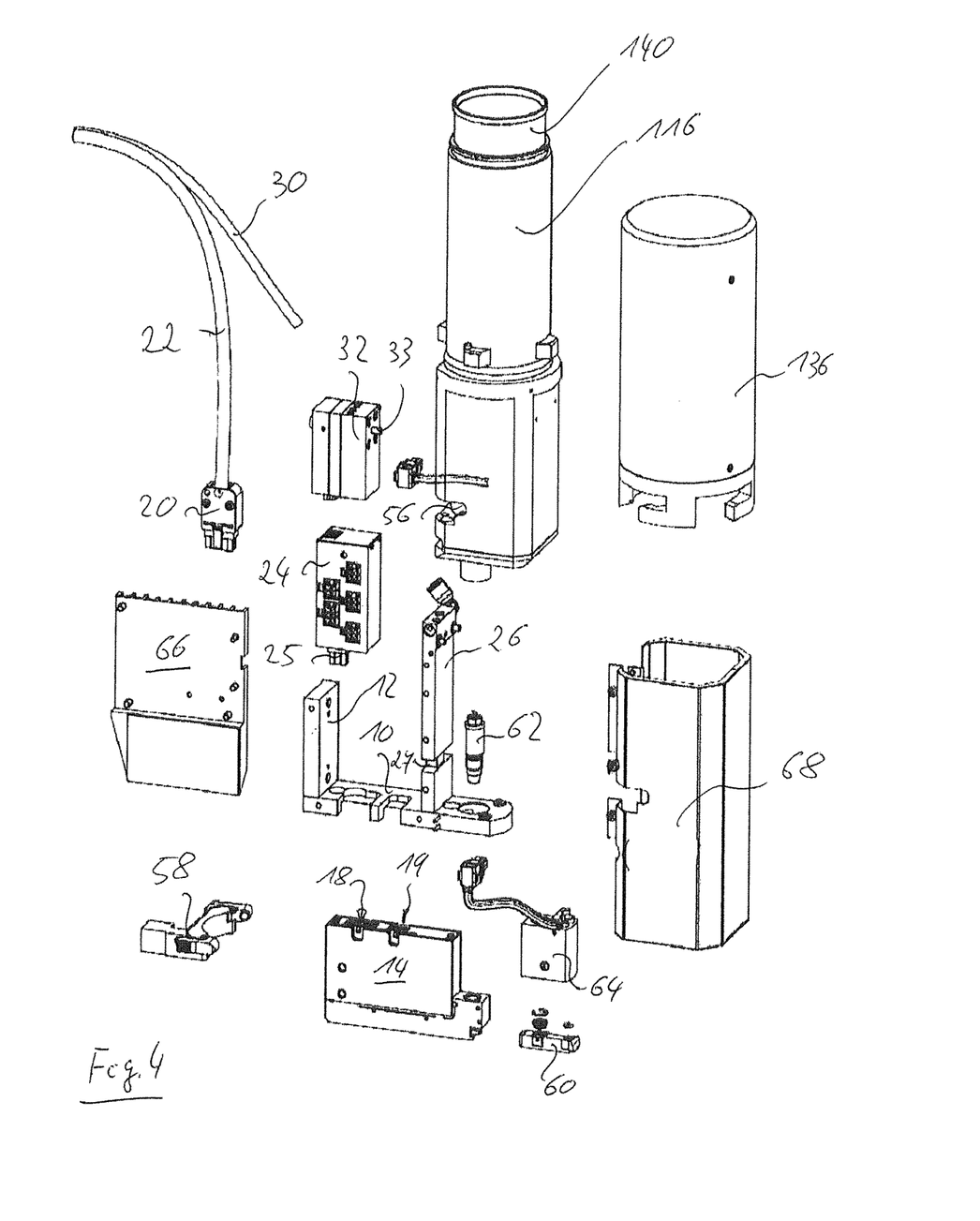
FIG. 4 an exploded view of a second embodiment of a metering unit.

It can furthermore be recognized from FIG. 4 that a compressed air passage 72 is integrated into the closure 36, via which compressed air passage compressed air can be conducted from the intermediate carrier 26 into the intermediate space 38, from there through the dry pack 70 and from there into the interior of the cartridge 40. With a properly latched bayonet fastening, the compressed air passage 72 of the closure 36 is aligned with the air passage 29 provided in the intermediate carrier 26, with a spring-loaded piston 74, which is sealed via O rings, being integrated into the closure 36 for the sealed connection. The connection of the air passages 29 and 72 therefore takes place via the intermediate carrier 26 solely by latching the bayonet fastening 36.

FIG. 4 shows a second embodiment of a metering unit, with the same components being provided with the same reference numerals. In this embodiment, a cartridge 140 provided in a media store 116 is not provided with wings and a closure 136 which is likewise provided with bayonet latches at its lower side is formed in hood shape and can be placed onto the media store 116 and can subsequently be latched by rotation. In this case, the supply of compressed air also takes place via air passages which are provided in the closure 136 and which are conducted from the lower side of the closure up to its upper side so that compressed air can be conducted into the interior of the cartridge 140.

Figure 5:
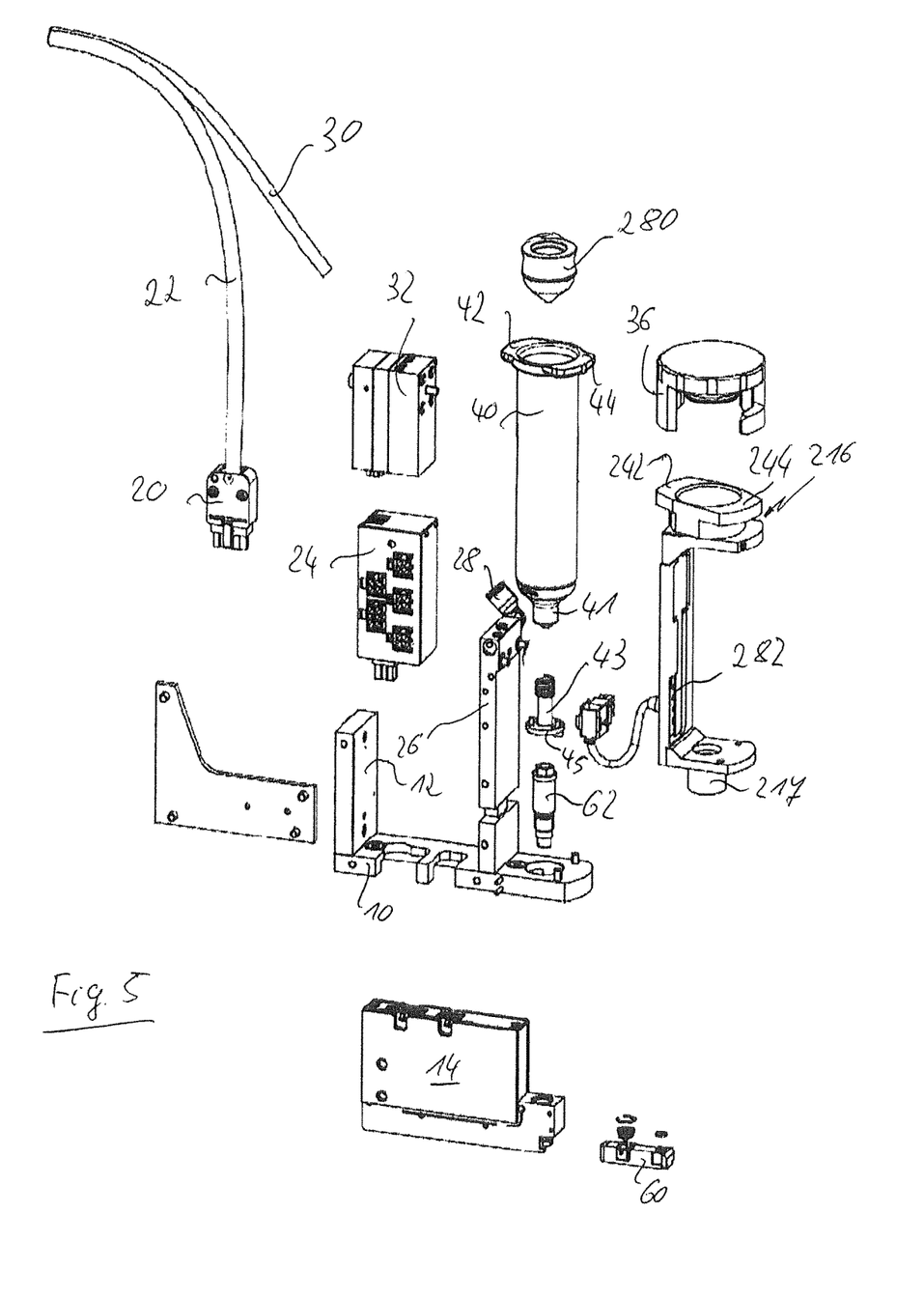
FIG. 5 an exploded view of a third embodiment of a metering unit.

FIG. 5 shows a third embodiment of a metering unit which uses a modification of a media store. The media store 216 used in the metering unit shown in FIG. 5 does not have a closed housing, but serves in the same way as the embodiment of FIGS. 1 to 3 for the reception of a commercial cartridge 40 which is provided with wings 42 and 44. With this cartridge—as also with the above-described embodiments—the cartridge outlet 41 is provided with a standardized internal thread (Luer lock) so that a connector piece 43 provided with a complementary thread can be screwed to the thread of the cartridge outlet 41. For this purpose, the cartridge is first inserted into the cartridge holder 216 from above and the connector piece 43 is subsequently completely screwed from the lower side of the cartridge holder 216 into the cartridge outlet 41 so that a ring web 45 of the connector piece 43 contacts a ring flange 217 of the media store 216 in an aligned manner. The cartridge 40 can subsequently be rotated in the peripheral direction such that its wings 42 and 44 come to lie in alignment with the corresponding flanges 242 and 244 of the media store 216. Subsequently, the connector piece 43 can be screwed to the ring flange 217, with curved elongate holes being provided in the ring web 45 to allow a fixing in different positions with respect to the orientation in the peripheral direction.

If the connector piece 43 is fixed to the media store 216 in this manner, the cartridge 40 can be screwed out of the connector piece 43 after emptying (and after releasing the closure 36) and can be replaced by a new cartridge. Since this new cartridge has the same thread shape, it can subsequently be inserted into the media store 216 and can be screwed in the connector piece 43, whereupon, after the complete screwing in, the wings 42, 44 of the cartridge 40 again come to lie in alignment with the corresponding flanges 242 and 244 of the media store 216.

In the embodiment shown in FIG. 5, an inner piston 280 serves for the filling level measurement; it is provided with a magnet 281 (cf. FIG. 6) and cooperates with a sensor 282 which is provided at the media store 216 and which is in turn electrically connected to the expansion module 24. The sensor 282 in the embodiment shown is formed from a series of Hall elements arranged next to one another which signal via the data bus when the piston 280 has reached its lower end position in the cartridge 40.

Figure 6:
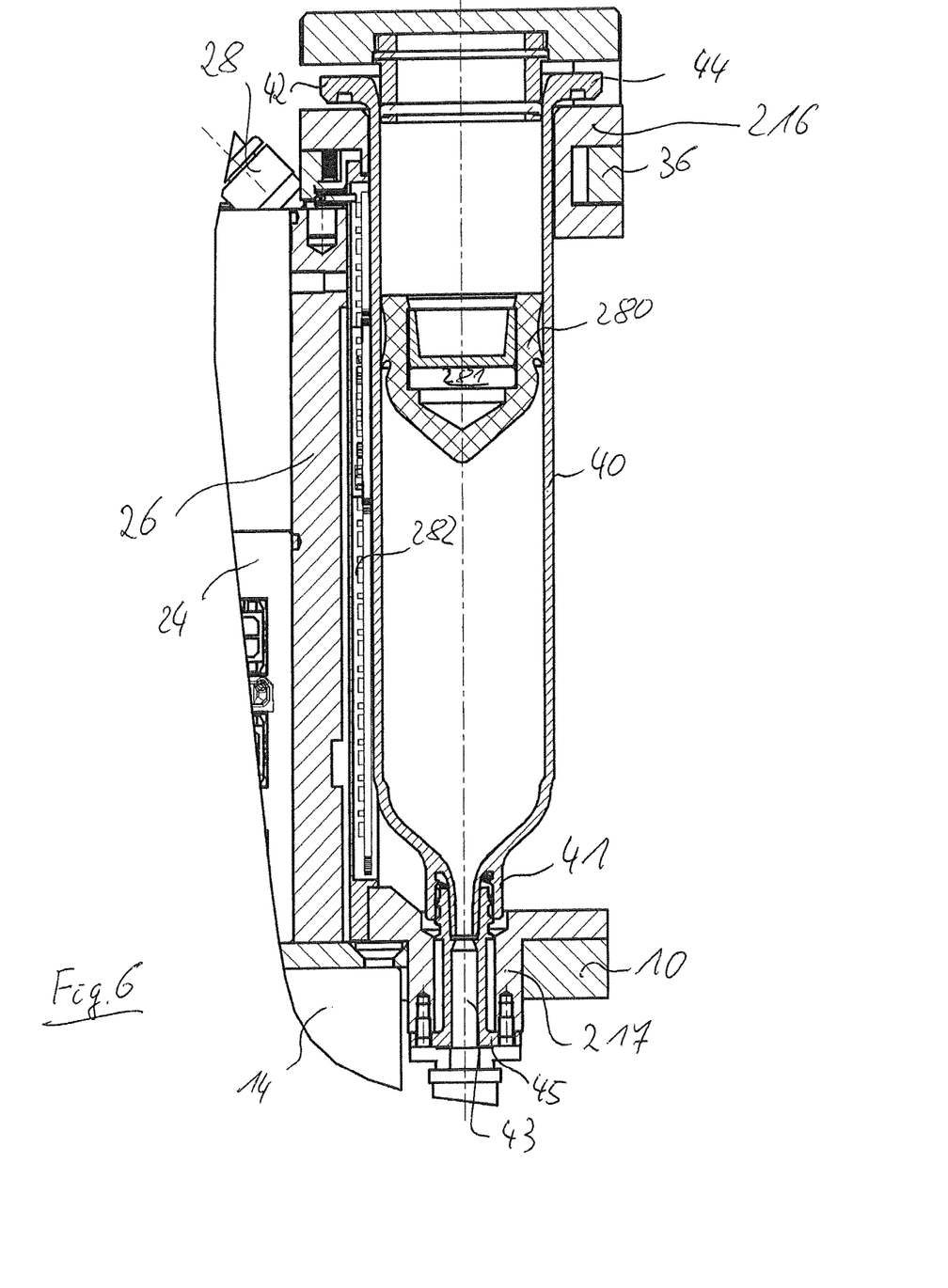
FIG. 6 a longitudinal section through the media store of the metering unit of FIG. 5.

FIG. 6 shows an enlarged sectional view through the cartridge 40 arranged in the media store 216, with the piston 280 with the magnet 281 arranged therein being easily recognizable in section. The connector piece 43 can likewise easily be recognized which is screwed in the cartridge outlet 41 and its ring web 45 is fixed (after a correct orientation of the cartridge 40 in the peripheral direction) to the ring flange 217 of the cartridge holder 216.

Figure 7:
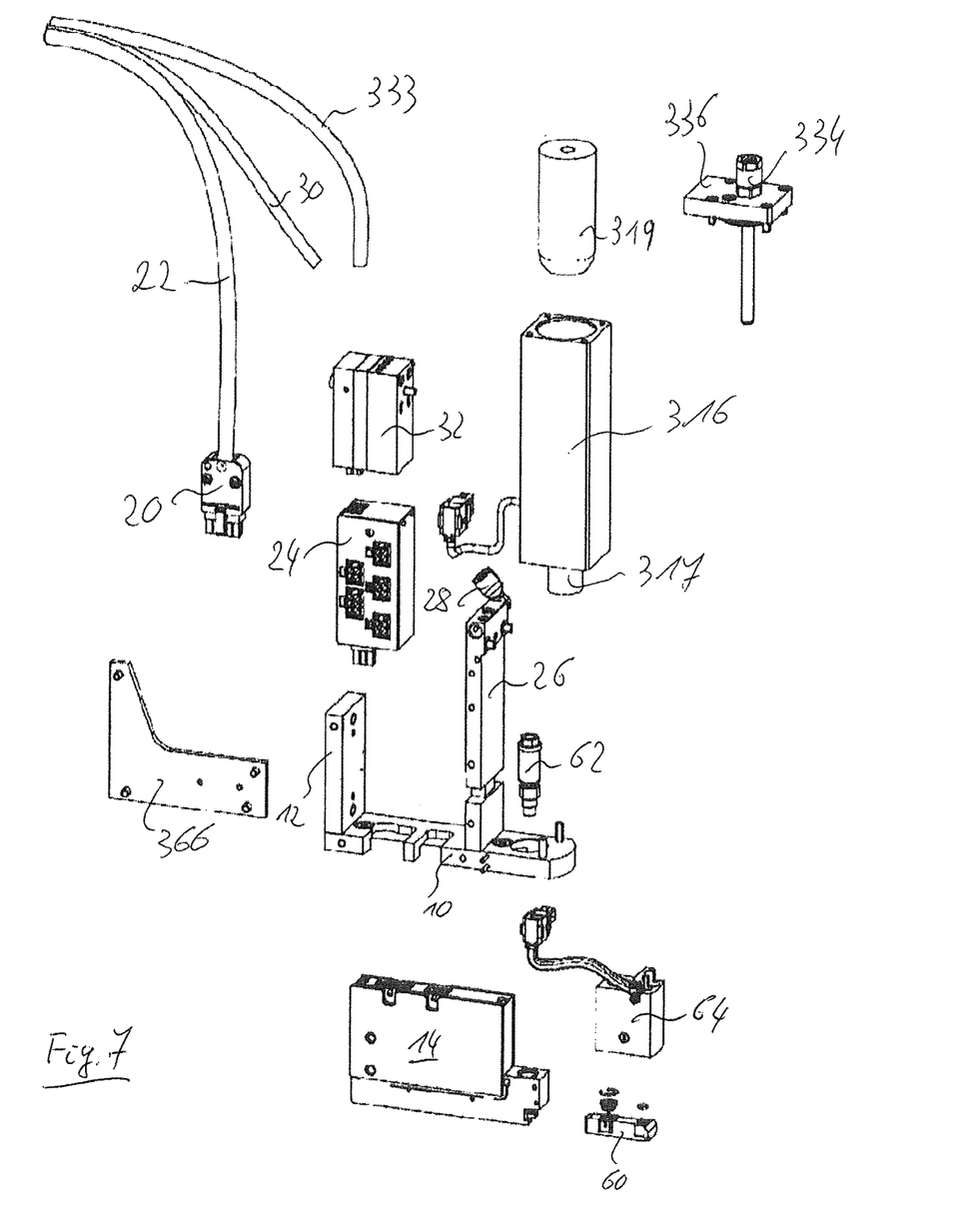
FIG. 7 an exploded representation of a fourth embodiment of a metering unit.

FIG. 7 shows a fourth embodiment of a metering unit in which a further modification of a media store 316 is provided. In this embodiment, the media store 316 is formed as a parallelepiped tank which is provided at its lower side with a ring flange 317 which is in turn plugged into an opening of the module carrier 10.

The media store 316 formed cylindrically in its interior is provided with a float body 319 which cooperates via an integrated magnet 318 with a filling level sensor 382 which is formed in the same manner as in the above-described embodiment.

Figure 8:
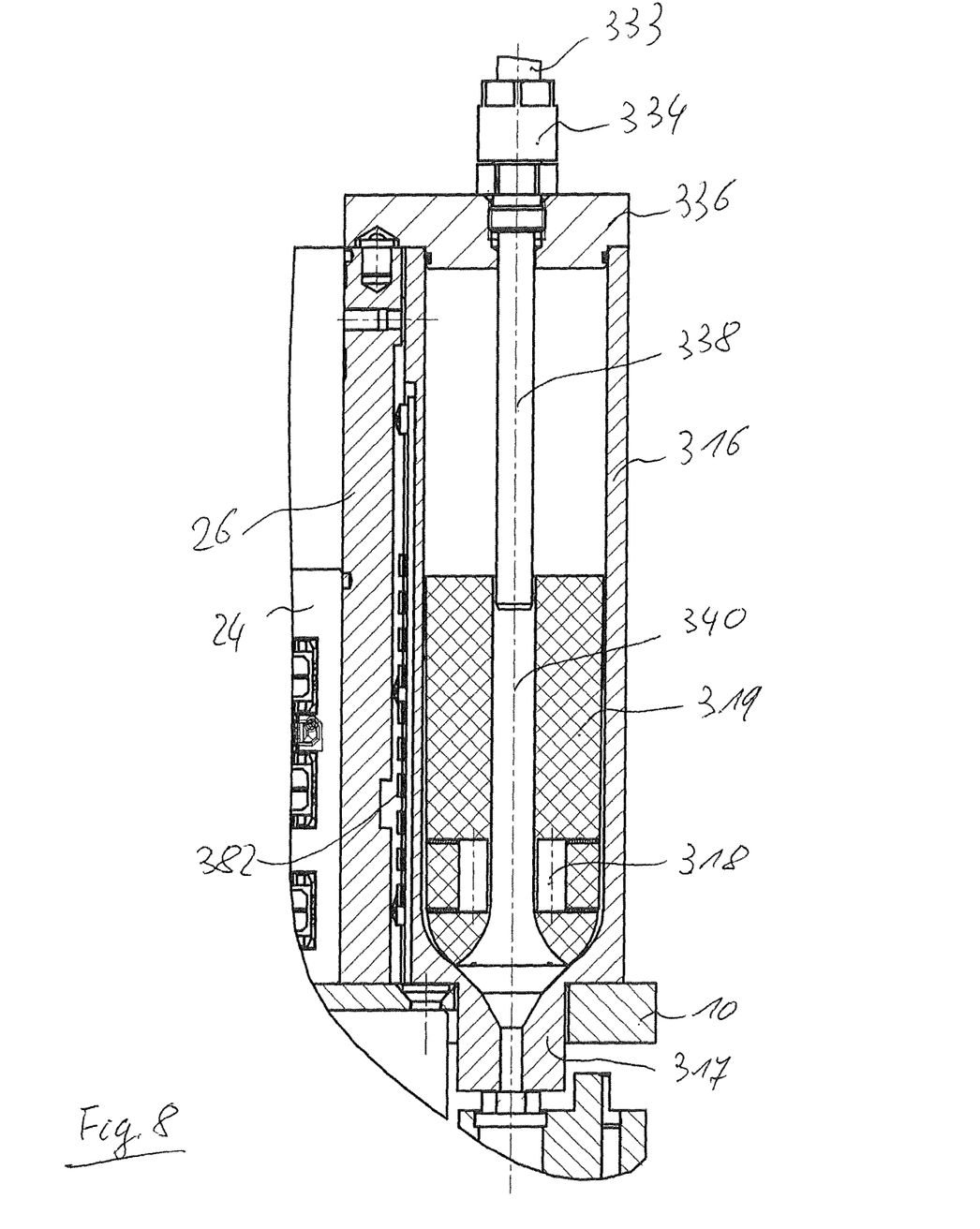
FIG. 8 a longitudinal section through the media store of the metering unit of FIG. 7.

In this embodiment, the filling of the media store 316 takes place via a filling connector 334 which is provided at the upper side and which is screwed in a cover 336 of the media store 316. A filling pipe 338 is plugged and fixed into the filling connector 334 from below; it extends approximately up to and into the middle of the media store 316 and its front end dips into a central passage 340 of the float body 319 when the latter is in its bottommost position shown in FIG. 8. The passage 340 extends from the upper side of the float body 319 up to its lower side at which it expands so that medium or liquid can be filled in via a media hose 333 through the filling pipe 338 and through the passage 340 up to the lower side of the tank. If this happens, the float body 319 is raised by buoyancy until it has reached its upper position in which the filling pipe 338 is substantially received in the float body 319.

Reference numeral 366 in FIG. 7 designates a cover without cooling ribs.

Figure 9:
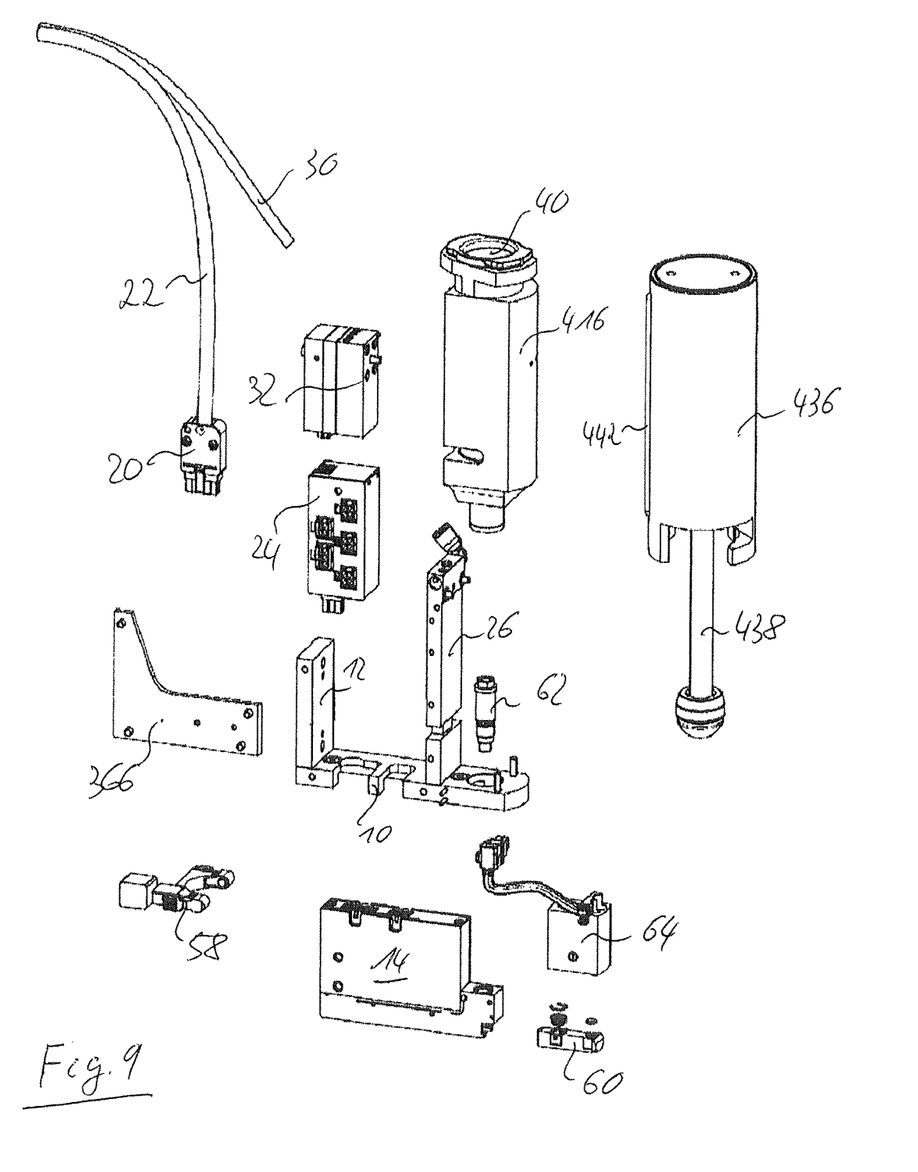
FIG. 9 an exploded representation of a fifth embodiment of a metering unit.

In the fifth embodiment of a metering unit shown in FIG. 9, a media store 416 is used which is of substantially a similar structure to the media store 16 of the first embodiment. The closure 436 provided for the fixing of the cartridge 40 to the media store 416, however, has an integrated pressure multiplier which is provided with a pressure plunger 438 which can be moved into the media store 416.

Figure 10:
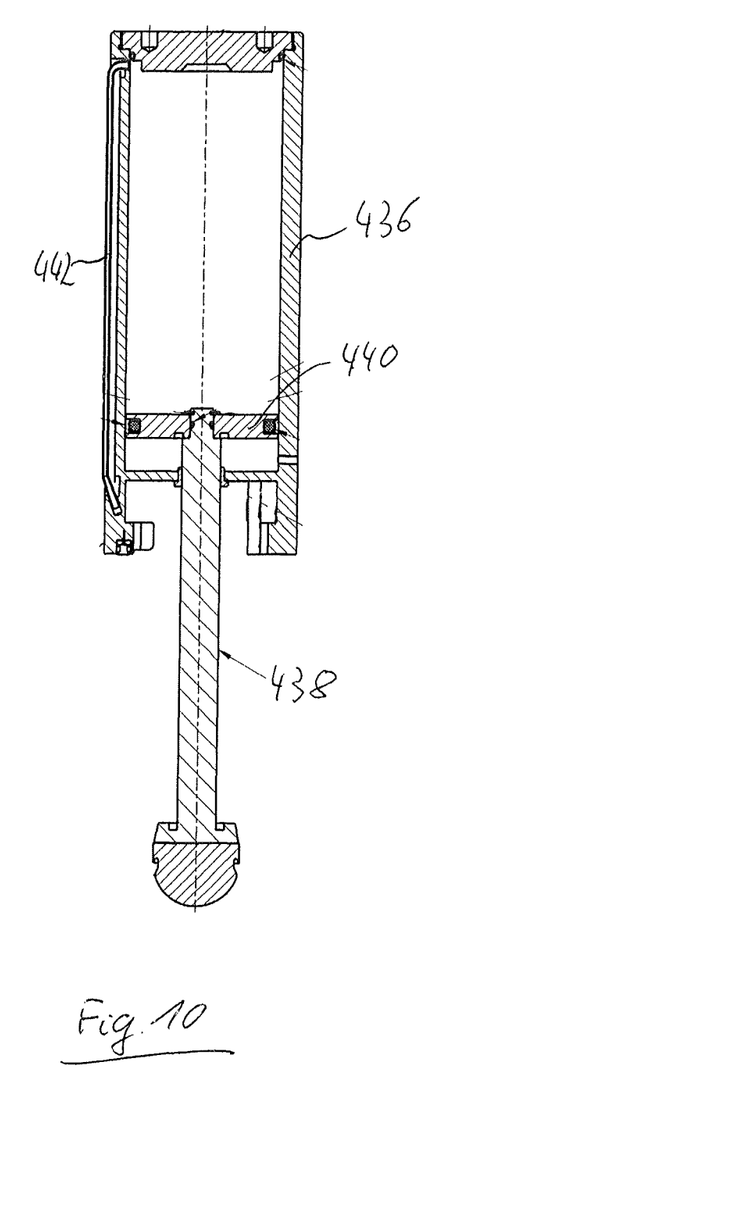
FIG. 10 a longitudinal section through the pressure multiplier of the metering unit of FIG. 9.

As FIG. 10 illustrates, a cylindrical hollow space is provided in the closure 436 in which a piston 440 sealed via an O ring is movable. The piston 440 displaces the pressure plunger 438 which in turn acts on a piston arranged in the media store 416. Due to the different cross-sectional surfaces of the piston 440 and the effective cross-section of the pressure plunger 438, a pressure multiplication takes place which, in the embodiment shown, increases the applied pressure by approximately a factor of 3.

The air guidance through the intermediate carrier 26 (FIG. 9) takes place in the same manner as in the first embodiment, with the compressed air being conducted from the outlet at the intermediate carrier 26 up to the upper side of the closure 436 via a line 442 which is guided at the outside of the closure 436.

Figure 11:
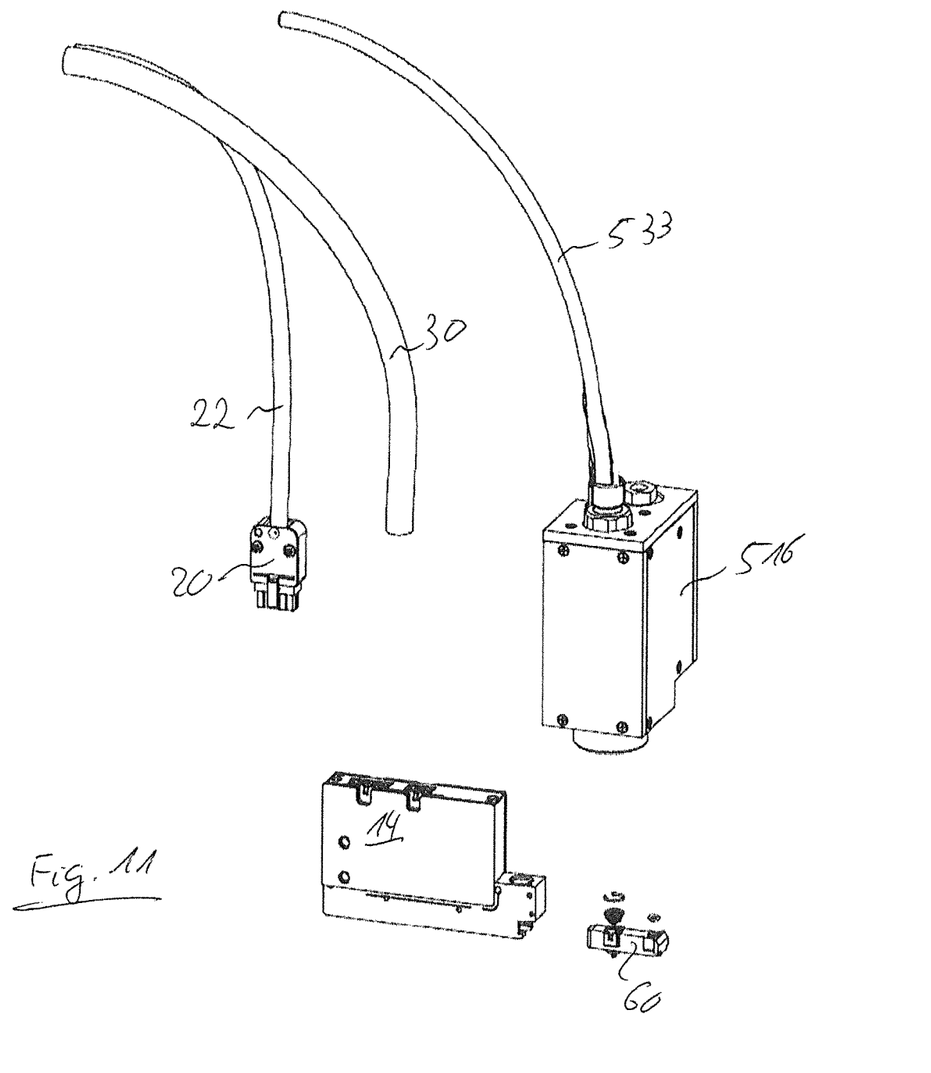
FIG. 11 an exploded representation of a sixth embodiment of a metering unit.

FIG. 11 shows a sixth embodiment of a metering unit, with only some of the components being shown. In this embodiment, a media store 516 has an integrated pressure store as well as an integrated heating device. In another respect, the remaining components of the metering unit are formed as in the above-described embodiments.

Figure 12:
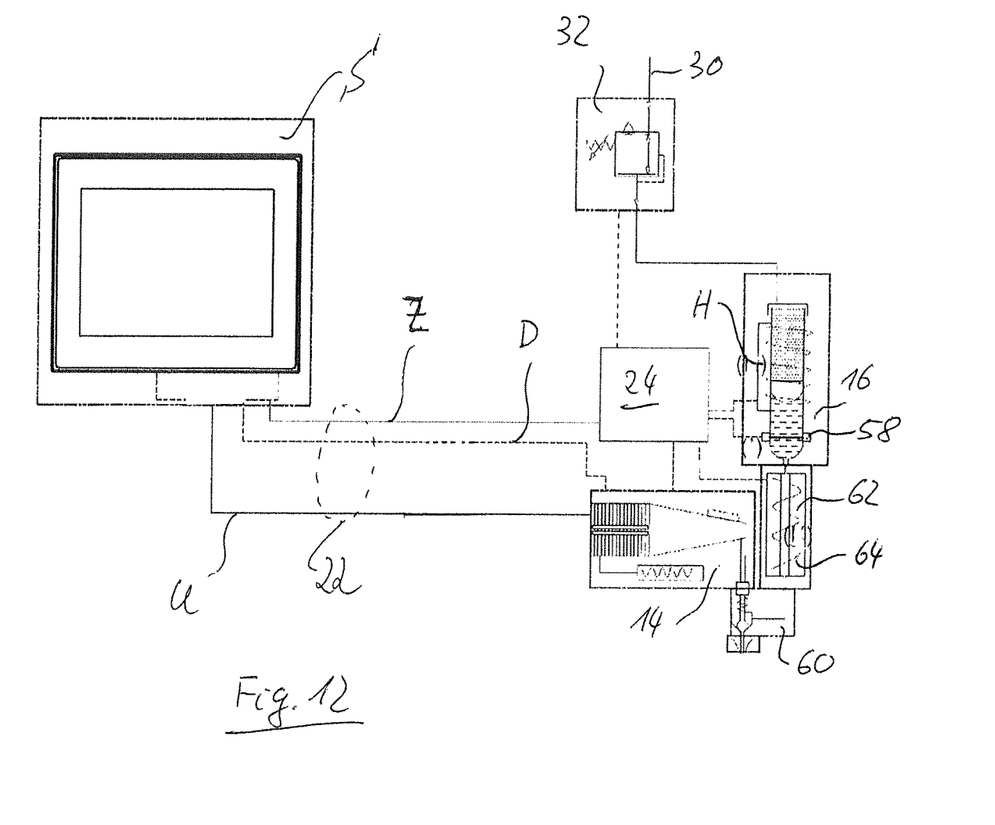
FIG. 12 a system plan of a metering unit.

FIG. 12 illustrates the electronic relationships of the individual components, with only the reference numerals of the first embodiment being indicated for reasons of simplicity. The metering unit is controlled by a control unit S having a control monitor, with a plurality of control units being able to be coupled in or externally connected. The electronic cable 22 for the connection of the valve module 14 includes both the voltage supply U for the valve module ad data lines D for controlling a data bus processor provided in the valve module 14. The expansion module 24 can either be supplied with voltage via the valve module 14 or power supply lines Z can additionally be provided in the cable 22 when components are connected which exceed the power consumption of a line. The expansion module 24 can also be directly supplied with voltage in this manner.

Further components which can be connected to the expansion module 24 are a heating device H in the region of the media store 16, the filling level sensor 58 at the media store 16, the heating device 64 and/or the regulation valve 32 for the compressed air supply via the compressed air line 30.

Figure 13:
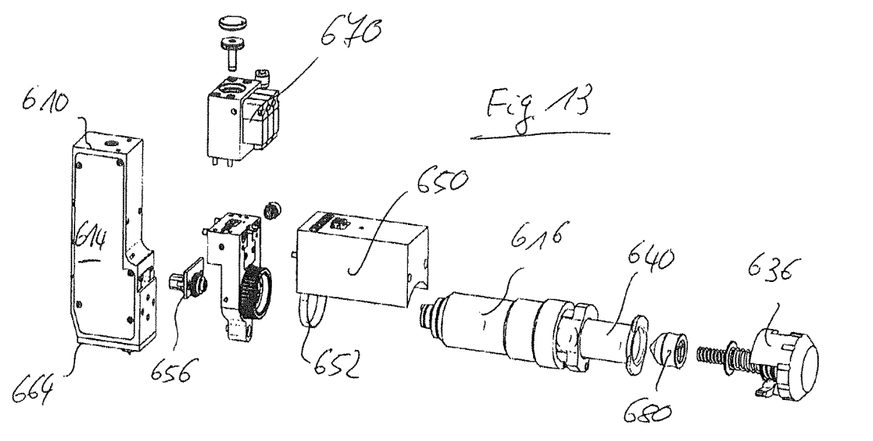
FIG. 13 an exploded representation of a seventh embodiment of a metering unit.
Figure 14:
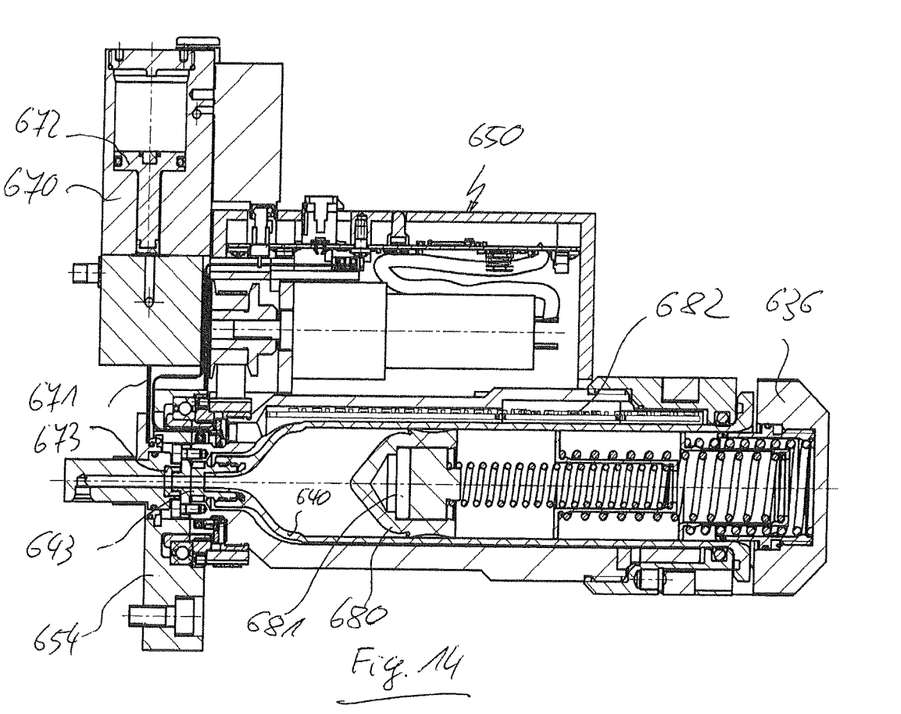
FIG. 14: a section through the metering unit of FIG. 13 in the assembled state.

FIGS. 13 and 14 show a seventh embodiment of a metering unit, with the valve module 614 being integrated in the module carrier 610 in this embodiment. A heating device 664 can be provided at the lower side of the module carrier 610 in order also to allow the metering of high-viscosity media. In this embodiment, the valve 614 is configured as a slider valve in which a circular opening is pushed over a circular valve seat, whereby the valve is opened and closed.

The media store 616 in this embodiment is cylindrical and receives a cartridge 640 in its interior, with a bayonet fastening 636 in turn being provided to fix the cartridge to the media store 660. The media store 616 and thus also the cartridge 640 in this embodiment are arranged in a horizontal position and rotatably about the horizontal axis to largely minimize the effect of the sedimentation of the fillers.

The cartridge 640 is in turn fastened in a connector piece 643 via a Luer lock connection. A piston 680 is introduced in the interior of the cartridge 640 and in turn includes a magnet 681 which cooperates with a filling level sensor 682. In addition, the piston 680 is pressed by a system of springs in the closure 638 toward the medium located in the cartridge to ensure a clear separation between the medium and gas/air. The closure 636 is configured as in the above-described embodiments.

The drive of the media store 616 takes place by a motor 650 which drives the media store 616 via a belt 652. The rotational speed of the motor can be set as desired and four-point bearings 654 can be used for guiding the rotatable media store. The media guidance in this respect takes place via a rotary leadthrough 656 to the valve 614. To increase the pressure, a pressure booster 670 can be used in which a piston 672 boosts the compressed air supply in a ratio of, for example, 8:1. It is advantageous here that the high pressure also acts on the rotary leadthrough from the outside so that it is only exposed to the preload pressure of the springs. For this purpose, the pressure generated by the pressure booster 670 is guided via a pressure line 671 up to and into the region of a rotary seal 673. At the same time, the same pressure is conducted via lines which are not shown and which are provided in the closure 636 to the rear side (the right side in FIG. 14) of the piston 680. In this respect, the pressure can be controlled with the aid of a control device such that the pressure within the cartridge is always a little higher to the left of the piston 680 than at the right side of the piston.

Figure 15:
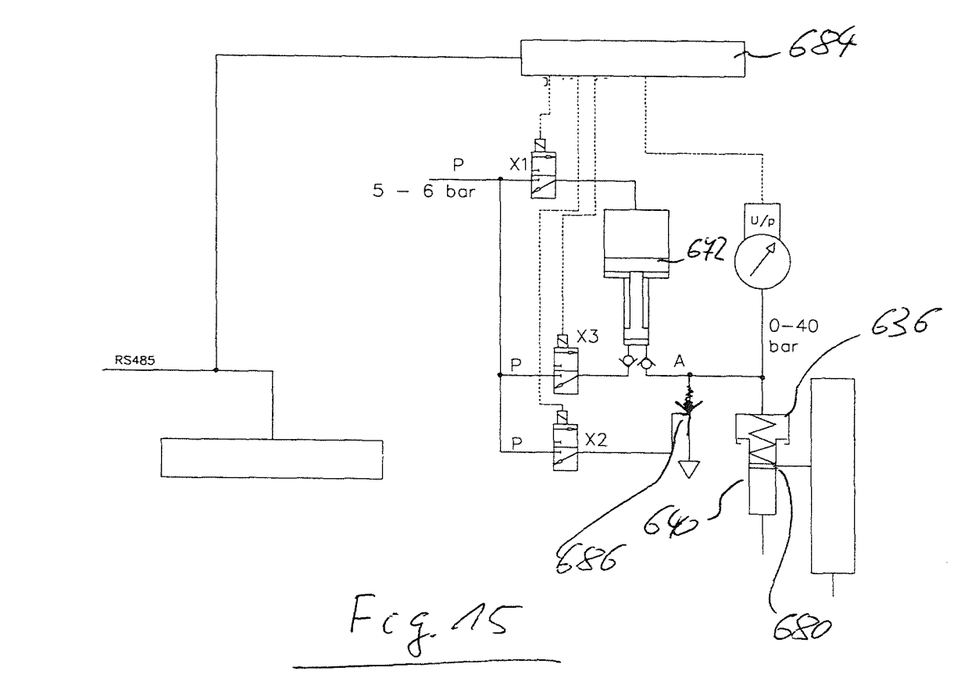
FIG. 15 a schematic representation of the hydraulic control of the metering unit of FIG. 14.

FIG. 15 shows a schematic representation of the control of the pressure booster 670. A control valve X1 is actuated via a schematically shown control 684, which is connected to the bus system, such that the piston 672 has compressed air applied. With a retracted piston 672, however, the piston space with a smaller cross-section is previously charged with compressed air via a valve X3 so that as a result a pressure can be applied in the region of the cartridge 640 on the rear side of the piston 680 in a magnitude of 40 bar.

An unlockable check valve 686 can be controlled with the aid of a further control valve X2 to vent the cartridge 640.

It is understood that the individual modules or components of the described metering units can be combined with one another as desired, i.e. combinations not explicitly described are also covered by the invention.

The invention claimed is:

1. A metering unit for an automated metering of liquid media, comprising
    a module carrier having a fastening element for fastening to a robot;
    a valve module which is fastened to the module carrier;
    a media store which is replaceably fastened to the module carrier;
    a single plug-in connector for the electrical supply via which plug-in connector a supply voltage and a data bus can be coupled to the valve module; and
    a replaceable expansion module for receiving a plurality of plug-in connectors that is connected to the module carrier and forms a distributor for electrical supply and data lines.

2. The metering unit in accordance with claim 1, wherein the fastening element is a replaceable fastening element.

3. The metering unit in accordance with claim 1, wherein the valve module is replaceably fastened to the module carrier.

4. The metering unit in accordance with claim 1, wherein the media store is configured as a heatable cartridge holder.

5. A metering unit for an automated metering of liquid media, comprising:
    a module carrier having a fastening element for fastening to a robot;
    a valve module which is fastened to the module carrier; and
    a media store which is replaceably fastened to the module carrier,
    wherein a receiver for a replaceable filling level sensor is provided at the media store.

6. The metering unit in accordance with claim 1, wherein a control valve for a compressed air supply is provided at the module carrier.

7. The metering unit in accordance with claim 1, wherein a closure is provided at the media store and a compressed air supply is conducted through the closure.

8. A metering unit for an automated metering of liquid media, comprising:
    a module carrier having a fastening element for fastening to a robot;
    a valve module which is fastened to the module carrier; and
    a media store which is replaceably fastened to the module carrier,
    wherein a closure is provided at the media store and a dry pack is integrated into the closure.

9. The metering unit in accordance with claim 1, wherein a closure is provided at the media store by means of which a cartridge inserted into the media store can only be locked in an orientation defined with respect to the peripheral direction.

10. A metering unit for an automated metering of liquid media, comprising:
    a module carrier having a fastening element for fastening to a robot;
    a valve module which is fastened to the module carrier;
    a media store which is replaceably fastened to the module carrier; and
    a connector piece provided with a thread for a cartridge outlet that is mounted at the media store such that it can be fixed in different positions with respect to its orientation in a peripheral direction of the cartridge.

11. The metering unit in accordance with claim 1, wherein a pressure multiplier operable with compressed air is attached to the media store, said pressure multiplier having a pressure plunger which can be moved into the media store.

12. The metering unit in accordance with claim 1, wherein a media supply can be replaceably arranged between the media store and the valve module.

13. The metering unit in accordance with claim 12, wherein the media supply is heatable.

14. The metering unit in accordance with claim 1, wherein the fastening element is a replaceable adapter plate.

15. The metering unit in accordance with claim 1, wherein the valve module has a data bus connector and a data bus processor.

16. A metering unit for an automated metering of liquid media, comprising
    a module carrier having a fastening element for fastening to a robot;
    a valve module which is fastened to the module carrier; and
    a media store which is replaceably fastened to the module carrier,
    wherein a float body is arranged in the media store and cooperates with a filling level sensor, with the media store being fillable through the float body.

17. The metering unit in accordance with claim 1, wherein a heating device is integrated in the media store.

18. The metering unit in accordance with claim 1, wherein the valve module is integrated into the module carrier.

19. A metering unit for an automated metering of liquid media, comprising
    a module carrier having a fastening element for fastening to a robot;
    a valve module which is fastened to the module carrier; and
    a media store which is replaceably fastened to the module carrier,
    wherein the media store is arranged in a horizontal position; and wherein a rotation device is provided to rotate the media store about its horizontal axis.

20. The metering unit in accordance with claim 8, wherein a closure is provided at the media store and a compressed air supply is conducted through the closure, wherein the compressed air is conducted out of the compressed air supply that is configured as a compressed air guide through the dry pack.

* * * * *